No. 868,597. PATENTED OCT. 15, 1907.
W. L. CHRYSLER & J. W. KAYS.
DRAFT EQUALIZER.
APPLICATION FILED DEC. 8, 1906.
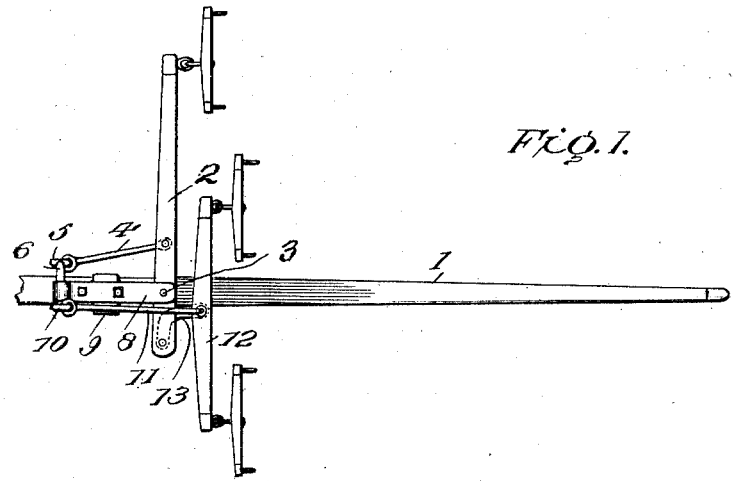
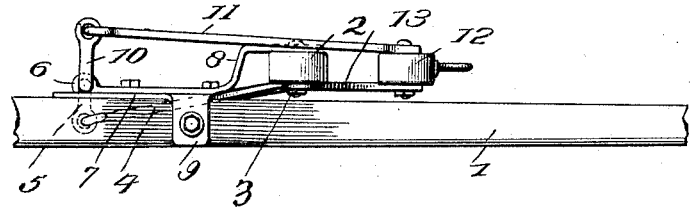
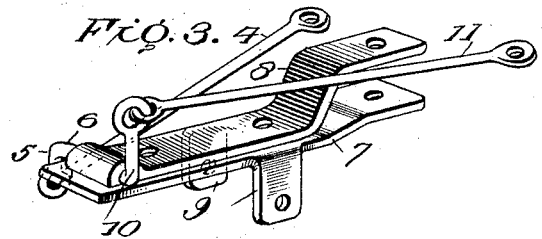
Witnesses
Inventors
W. L. Chrysler
J. W. Kays
By R. A. P. Lacey.
Attorney

UNITED STATES PATENT OFFICE.

WILLIAM L. CHRYSLER AND JOSEPH W. KAYS, OF EUGENE, OREGON.

DRAFT-EQUALIZER.

No. 868,597.   Specification of Letters Patent.   Patented Oct. 15, 1907.

Application filed December 8, 1906. Serial No. 346,947.

*To all whom it may concern:*

Be it known that we, WILLIAM L. CHRYSLER and JOSEPH W. KAYS, citizens of the United States, residing at Eugene, in the county of Lane and State of Oregon, have invented certain new and useful Improvements in Draft-Equalizers, of which the following is a specification.

This invention provides means for equalizing the draft of three or more horses when hitched to a machine or vehicle provided with a pole, or tongue, in such a manner as to admit of an unequal number of draft animals being arranged upon opposite sides of the pole.

The invention consists of the novel features, details of construction and combinations of parts which hereinafter will be more particularly set forth, illustrated and finally embodied in the subjoined claims.

In the drawings hereto attached and forming a part of the specifications: Figure 1 is a top plan view of a draft equalizer showing the invention adapted for three horses. Fig. 2 is a side view of the equalizer. Fig. 3 is a detail perspective view showing more clearly the relative arrangement of the different irons and connections.

Corresponding and like parts are referred to in the following description and indicated in all the views of the drawings by the same reference characters.

The pole or tongue 1, may be such as applied to any agricultural machine, or vehicle, designed to be propelled by having the draft animals arranged upon opposite sides of the pole in unequal number. The numeral 2 indicates a lever fulcrumed at 3 so as to provide a short arm and a long arm, the latter having a swingletree at its outer end to which an animal is hitched in the accustomed way. A rod 4 connects the long arm of the lever 2 with a crank arm 5 at one end of a shaft 6 which is journaled to the pole, or tongue. The lever 2 is arranged between the front ends of plates or irons 7 and 8 which are secured to the pole, or tongue.

The lower iron 7 is provided with spaced wings 9 which embrace the pole, or tongue, and are bolted, or otherwise secured thereto. The rear portion of the iron 7 rests upon the pole, whereas the front portion in advance of the wings 9 is spaced from the pole a short distance so as to hold the lever 2 clear of the pole. The upper iron 8 rests upon the iron 7 and is secured thereto and to the pole. The front portion of the iron 8 is off-set and spaced from the front portion of the iron 7 a distance to receive the lever 2 between them. The fulcrum 3 consists of a bolt, or other fastening which connects the front ends of the irons 7 and 8 and passes through the lever 2 to retain it in place. The rear portion of the iron 8 is grooved, or bent, so as to fit over the shaft 6 and form a keeper therefor.

The shaft 6 is provided at opposite ends with crank arms which are diametrically arranged, the arm 5 being pendent, whereas the crank arm 10 at the opposite end of the shaft 6 extends upwardly and receives the rear end of a rod 11, or like connection, the front end of said rod 11 being attached to a whiffletree 12 which is provided at its ends with swingletrees in the usual manner, to which horses are adapted to be hitched in the well known way when the equalizer is in service.

A bell crank or link 13 connects the short arm of the lever 2 with the whiffletree 12, one arm having a transverse arrangement, whereas the opposite arm is disposed longitudinally. The whiffletree 12 projects about an equal distance upon opposite sides of the pole, or tongue, and by reason of the connections of the shaft 6 and lever 2, the draft is evenly distributed upon opposite sides of said pole.

The crank arms 5 and 10 are of unequal length, the latter being longer than the former. It will be observed that as the short arm of the lever 2 moves forward, the crank arm 10 correspondingly moves forward as well as the bell crank 13, the latter in addition to its forward movement, turning upon its pivotal connection with the short arm of the lever 2. It is noted that the single animal hitched to the long arm of the lever 2 has the advantage of the increased leverage, hence is enabled to pull a proportionate amount corresponding to the effective draft of each of the animals hitched to the whiffletree.

Having thus described the invention, what is claimed as new is:

1. In a draft equalizer, the combination of a tongue, a lever fulcrumed upon the tongue to provide a long arm and a short arm, means for connecting a draft animal to the long arm of the lever, a whiffle tree, a link loosely connecting the whiffle tree to the short arm of the lever, a shaft journaled upon the tongue transversely thereof and provided at its opposite ends with oppositely disposed crank-arms, a rod connecting one of the crank levers to the long arm of the lever, and a second rod connecting the opposite crank arm to the before mentioned whiffle tree.

2. In a draft equalizer, the combination of a tongue, a pair of plates secured to the tongue, the forward ends of the plates being spaced from each other and from the tongue, a lever fulcrumed at an intermediate point between the spaced ends of the plates to provide a long arm and a short arm, means for connecting a draft animal to the long arm, a whiffle tree, a link loosely connecting the whiffle tree to the short arm, a shaft journaled between the before mentioned plates and provided at its opposite ends with crank arms, a rod connecting one of the crank arms to the long arm of the lever, and a second rod connecting the opposite crank arm to the before mentioned whiffle tree.

3. In a draft equalizer, the combination of a pole, or tongue, an iron secured to said pole and having its front portion spaced therefrom, a second iron placed upon the lower iron and secured thereto and to the pole, and having its front portion spaced from the front portion of the lower iron, a shaft journaled between the two irons and having oppositely disposed crank arms of unequal length, a lever fulcrumed between the front ends of said irons to provide arms of unequal length, a rod connecting the long arm of the lever with the short crank arm of said shaft, a whiffletree, a bell crank connecting the whiffletree with the short arm of said lever and a rod connecting the whiffletree with the long crank arm of the aforementioned shaft.

In testimony whereof we affix our signatures in presence of two witnesses.

WILLIAM L. CHRYSLER. [L. S.]
JOSEPH W. KAYS. [L. S.]

Witnesses:
L. M. TRAVIS,
L. C. E. ROSS.